UNITED STATES PATENT OFFICE.

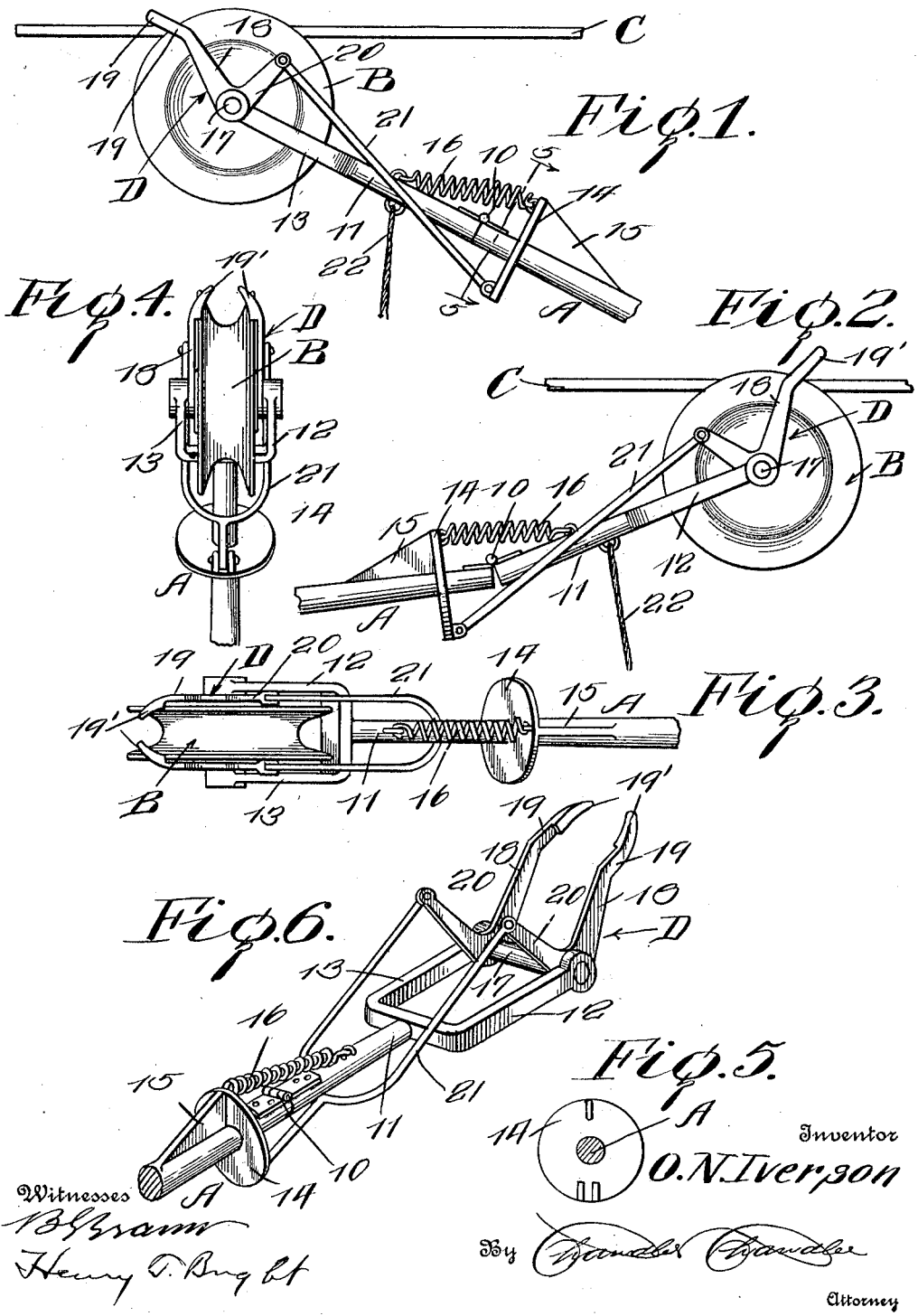

OLE N. IVERSON, OF HILLS, MINNESOTA.

TROLLEY-HEAD.

1,048,314.   Specification of Letters Patent.   Patented Dec. 24, 1912.

Application filed April 23, 1912. Serial No. 692,596.

*To all whom it may concern:*

Be it known that I, OLE N. IVERSON, a citizen of the United States, residing at Hills, in the county of Rock, State of Minnesota, have invented certain new and useful Improvements in Trolley-Heads; and I do hereby declare the following to be a full, clear, and exact description of the invention, such as will enable others skilled in the art to which it appertains to make and use the same.

This invention relates to trolley heads.

The object of the invention resides in an improved construction of trolley head whereby the trolley wheel is constantly forced against the trolley wire through the instrumentality of a spring element and which further includes means adapted to catch the trolley wire and bring the trolley wheel back into engagement therewith in the event of an excessive tendency of the trolley wheel to become disengaged from the trolley wire.

With the above and other objects in view, the invention consists in the details of construction and in the arrangement and combination of parts to be hereinafter more fully described and particularly pointed out in the appended claim.

In describing the invention in detail, reference will be had to the accompanying drawings wherein like characters of reference denote corresponding parts in the several views, and in which—

Figure 1 is a side elevation of the upper end of a trolley pole provided with the improved head, Fig. 2, a view similar to Fig. 1 looking at the opposite sides of the pole and showing the position of the parts of the head when the upper end of the pole has moved away from the trolley wire beyond a certain distance, Fig. 3, a plan view of what is shown in Fig. 1, Fig. 4, a rear view of what is shown in Fig. 1, Fig. 5, a section on the line 5—5 of Fig. 1, and Fig. 6, a detail perspective view of the trolley head with the trolley wheel removed.

Referring to the drawings A indicates a trolley pole which has secured to the outer end thereof by means of a hinge 10 an extension 11. The free end of this extension 11 terminates in a fork including arms 12 and 13 between which latter is rotatably mounted a trolley wheel B. The trolley A is provided adjacent the hinge 10 with a flange 14 strengthened by means of a brace 15 one end of which is secured to the flange and the other end suitably anchored to the trolley pole A. A tension spring 16 has one end secured to the flange 14 and its other end anchored to the extension 11 the position of such spring being such that it constantly tends to move the free end of the extension 11 and the trolley wheel B toward the line wire C. The journal shaft of the trolley B is indicated at 17 and rotatably mounted on this shaft on each side of the trolley wheel B is an angle lever D comprising an intermediate arm 18 and terminal arms 19 and 20, said arm 19 extending beyond the peripheral limit of the trolley wheel B and having its free end enlarged as at 19' so as to extend slightly over the periphery of the trolley wheel. Each of the angle levers D are mounted upon the shaft 17 at the junction of the arms 18 and 20. The free end of each arm 20 is connected to the flange 14 by means of a link 21, the connection of said link with the arm 20 and flange 14 respectively being of a pivotal type. The extension 11 has secured thereto the usual rope 22 by means of which the trolley pole may be drawn down to disengage the trolley wheel from the line wire.

By this construction it will be apparent that as the free end of the trolley pole A moves away from the line wire the spring 16 will act automatically to maintain the wheel B in proper engagement with the line wire. This movement of the free end of the trolley pole will also cause the angle levers D to rock on their pivot so as to shift the ends 19 of said levers a greater distance above the trolley wire. This movement of the angle levers D will as is obvious position the ends 19 of said levers so as to guard against any excessive tendency of the trolley wheel to become disengaged from the trolley wire inasmuch as a greater length of the angle levers D will be disposed above the trolley wheel.

What is claimed is:

In a trolley head, the combination of a trolley pole having a hinged extension at its free end, a trolley wheel rotatably mounted on the free end of said extension, an angle lever pivotally mounted on the free end of said extension at each side of the trolley wheel, said angle levers comprising relatively short and long arms the latter of which extends beyond the peripheral limit of the trolley wheel, a flange on the trolley pole adjacent its hinged connection with said extension, links having one end pivotally connected to said flange and their other ends pivotally connected to the relatively short arms of said angle levers respectively, and a spring having one end connected to said flange and its other end connected to said extension, said spring constantly tending to move the free end of the extension and the trolley wheel upwardly with respect to the free end of the trolley pole.

In testimony whereof, I affix my signature, in presence of two witnesses.

OLE N. IVERSON.

Witnesses:
CARL J. WOODSON,
HENRY WESTHE.

Copies of this patent may be obtained for five cents each, by addressing the "Commissioner of Patents, Washington, D. C."